April 15, 1952 E. W. BREISCH ET AL 2,592,650

CONTROL APPARATUS FOR TELEPHONE SYSTEMS

Filed May 26, 1948 2 SHEETS—SHEET 1

INVENTORS.
Edgar W. Breisch and
George W. McKenna
BY
[signature]
THEIR ATTORNEY

CONTROL APPARATUS FOR TELEPHONE SYSTEMS

Filed May 26, 1948

2 SHEETS—SHEET 2

INVENTORS.
Edgar W. Breisch and
George W. McKenna
BY
THEIR ATTORNEY

UNITED STATES PATENT OFFICE 2,592,650

CONTROL APPARATUS FOR TELEPHONE SYSTEMS

Edgar W. Breisch, Edgewood, and George W. McKenna, Penn Township, Allegheny County, Pa., assignors to Westinghouse Air Brake Company, a corporation of Pennsylvania Application May 26, 1948, Serial No. 29,346

4 Claims. (Cl. 179—2.5)

Figure 2:
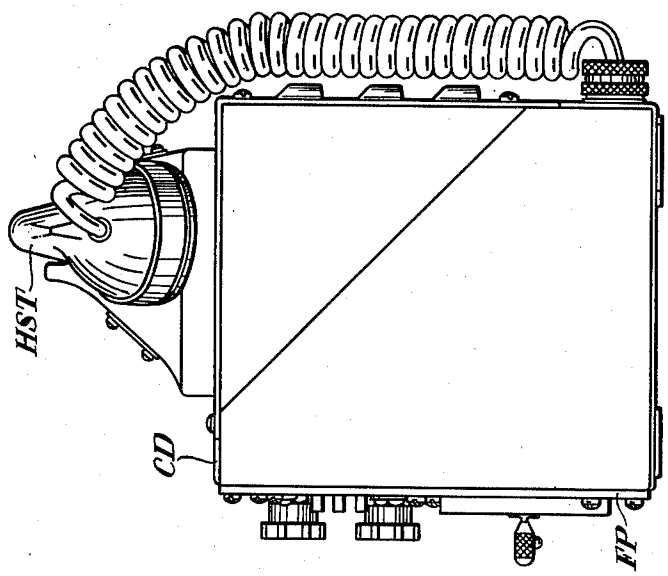

Our invention relates to control apparatus for telephone systems, and more particularly to control apparatus to correlate the equipments of a plurality of independent telephone systems.

Frequently a tower or station located along the trackway over which vehicles operate is provided with equipment by which the operator at the tower can telephone to a remote central office and also with equipment by which the operator can telephone to vehicles operating over the trackway. For example, a tower along a railroad is frequently provided with line telephone equipment by which an operator at the tower can talk with the dispatcher at a terminal office and also with electromagnetic wave telephone equipment by which the operator can talk with the crew of a train operating in the vicinity of the tower. The line telephone equipment may be any one of several known forms for a dispatcher's telephone system and it would include a two-wire line circuit extending from the dispatcher's office to several towers along the railway, each tower being equipped with a selector ringer and a coupling unit as well as a telephone set and other facilities. Generally speaking the dispatcher's telephone system will be of the voice frequency type. The train telephone system may be of the space radio or of the carrier inductive type and the equipment includes a receiver and a transmitter using a carrier frequency current.

When two such independent telephone systems are provided at a tower, the tower must have telephone receiving and transmitting devices for each system. That is, a wayside tower provided with dispatcher's telephone equipment and train telephone equipment would have, as has been the custom heretofore, a loud-speaker and a hand set for the train telephone system and a head set and a microphone for the dispatcher's telephone system. Since there is no interlock between the two systems, a call or message may come in on the train communication system while the operator is busy on the dispatcher's telephone line and vice versa. At most places, and especially at busy points, the operator may be required to wear the head set substantially all the time. This means that in order for him to answer a call on the train communication system, the head set must be removed and the hand set picked up and the controls of the train telephone system manipulated. This inconvenient arrangement may result in the train communication calls going unanswered or at least not answered promptly. That is, the unhandy set-up heretofore used at towers along a railway tends to delay the work of the operator and cause poor service to both dispatcher and train telephone systems.

Accordingly, a feature of our invention is the provision of wayside control means to correlate a train telephone system and a line telephone system.

Another feature of our invention is the provision of an improved wayside control station for connecting a head set and a microphone to either train telephone equipment or to line telephone equipment.

Another feature of our invention is the provision of an improved telephone wayside control station that matches up with the so-called "concentrator" unit of a dispatcher's telephone line system for facilitating the answering of calls of both systems.

Again, a feature of our invention is the provision of improved wayside control apparatus for railway train communication systems.

A more specific feature of our invention is the provision of a novel wayside control station to improve the operating characteristics of the equipment of a two-channel carrier train telephone system.

Other features, objects and advantages of our invention will appear as the specification progresses.

To attain the foregoing features, objects and advantages of our invention, we provide a control station housed in a cabinet which is designed to match up with the usual coupling or "concentrator" unit frequently installed in a tower for the telephone system. For the operator's convenience the required switches or keys of the control station are grouped on a front panel of the cabinet and are of the telephone type familiar to the operator. The two units can thus be mounted side by side within reach of the tower operator so that the two units can be operated by him as a single device.

One of the keys on the panel of the control station is a two-position system selector key operatively connected to a two-position circuit controller which is housed in the cabinet and the contacts of which controller serve to connect the operator's head set and microphone to either the train communication equipment or to the dispatcher's telephone equipment according to the position of the key. In this way the operator can select the system with which his head set and microphone are to be used by the simple manipulation of the one key of the control station.

Since the train communication system is usually operated on the push-to-talk basis, the operator's foot switch is provided with a contact which is interposed in a circuit governed by this system selector controller so that the foot switch can be used as a push-to-talk device for the train communication system.

When the train communication system is a multiple channel arrangement, loud-speakers, one for each frequency channel of the communication system, are housed in the control station cabinet, and each loud-speaker is provided with its own volume control governed by an adjustable device located on the front panel near the respective loud-speaker. Also, indicator lamps, one for each frequency panel are mounted on the panel of the control station to visually indicate the frequency channel at which the operator is being called. These indicator lamps are controlled in such a manner that, regardless of the sensitivity at which the respective loud-speaker is set, there is no diminution in the brightness of the lamp in response to a call on the train telephone system. With both visual and audible call signals on each frequency channel, the possibility of the operator failing to observe an incoming call on the train telephone system is remote even when the loud-speaker volume is adjusted to a point where it is no longer, or at least barely, audible, such a loud-speaker adjustment being sometimes found necessary when an important train order is being received over the dispatcher's telephone system.

To permit emergency calls and calls by a maintainer or other authorized persons over the train communication system without disturbing the operator, the control station is preferably provided with a hand set and a hand set key, the hand set key being mounted on the panel and operatively connected to a controller which governs the connection of the hand set to the train communication equipment. The control station includes an interlock preferably governed by the system selector key and by which interlock the operator is permitted to lock out the hand set and obtain priority in the use of the train communication system if an emergency condition suddenly arises.

The control station is also provided with jacks and other circuit facilities so that the dispatcher's line circuit equipment can be connected to the train communication equipment for the dispatcher at the remote office to hear both sides of a conversation between the tower operator and the crew of a train. To improve the dispatcher's listening-in facility an amplifier is preferably made a part of the control station, the amplifier assuring the necessary voice frequency energy for transmission over the dispatcher's line circuit.

We shall describe one form of apparatus embodying our invention and shall then point out the novel features thereof in claims.

Figure 1:
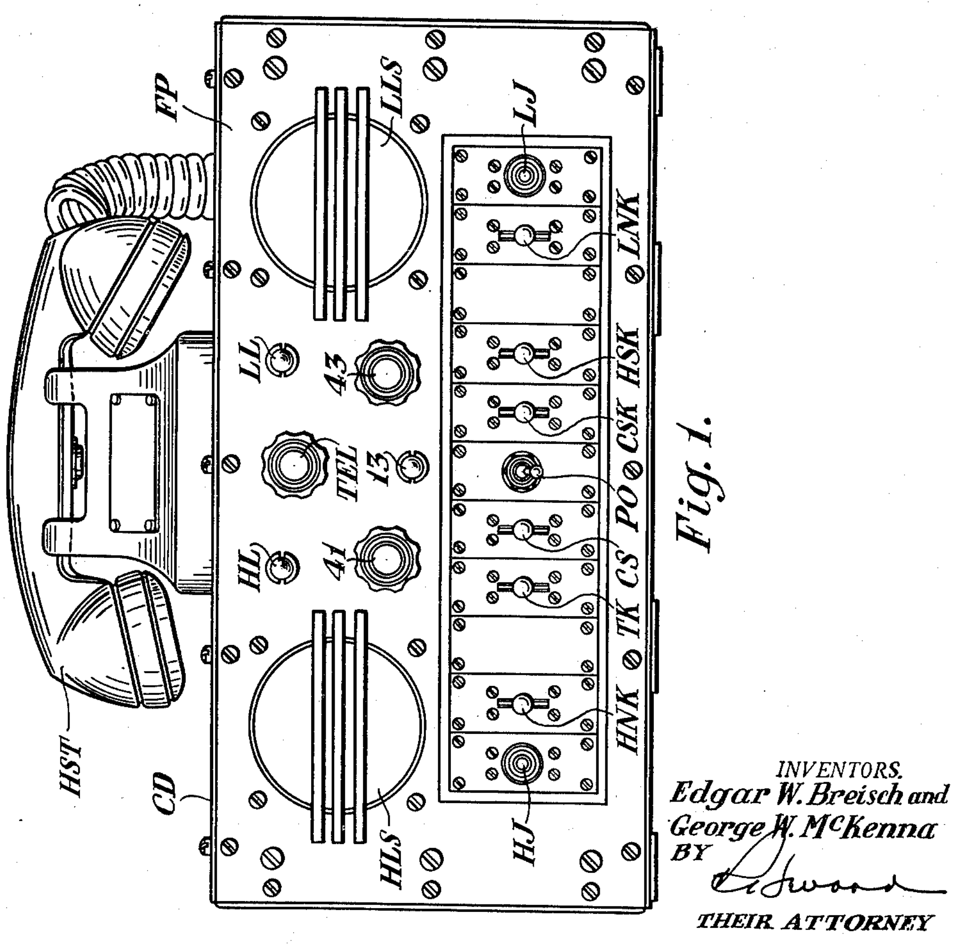
Figure 3:
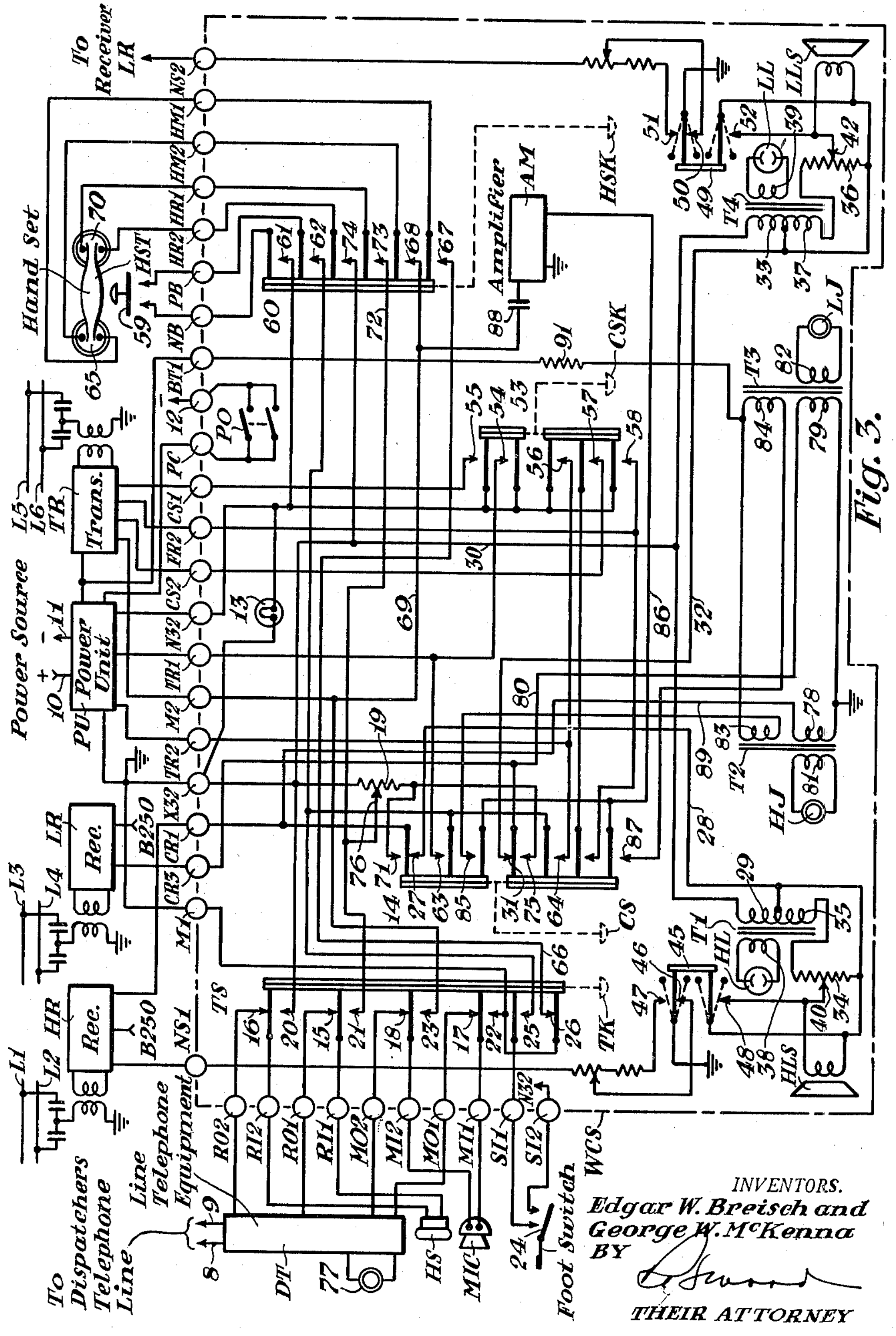

In the accompanying drawings, Figs. 1 and 2 are a front view and an end view, respectively, showing a control station embodying our invention when used at a wayside railway tower provided with a dispatcher's telephone system and with a train communication system, the train communication system being a two-channel arrangement using simplex operation. Fig. 3 is a diagrammatic view showing the apparatus and circuits of the control station of Figs. 1 and 2 and the manner of correlating the train communication equipment with the dispatcher's telephone equipment.

In each of the different views like reference characters are used to designate similar parts.

It is to be understood that our invention is not limited in its use to a railway tower or to a train communication system of the two-channel type and this one application serves to illustrate the many places the apparatus is useful.

Referring first to Fig. 3, a control station is designated as a whole by a dot and dash rectangle WCS and which control station is housed as shown in Figs. 1 and 2 in a cabinet or case designated by the reference character CD. The cabinet is of any suitable material and construction and its dimensions and construction are made identical as far as possible with the dimensions and construction of the usual so-called "concentrator" unit provided at towers for a dispatcher's telephone system. Also, the trimming and finishing of the cabinet CD are preferably made to correspond with that of the "concentrator" for the sake of appearance. The control station loud-speakers, switch keys, lamps and other devices to be referred to from time to time, are mounted on a front panel FP of the cabinet CD and are of the telephone type to correspond with corresponding devices on the concentrator unit. It follows that this control station WCS housed in cabinet CD can be mounted in a tower side by side with the dispatcher's concentrator unit for the two to be manipulated by the station operator as a single device. For example, these two units could be mounted side by side on the operator's desk for both to be within easy reach of the operator to make it possible for the operator to handle both the calls on the dispatcher's line circuit and the train communication calls from one position.

It should be noted at this point that the train communication system with which this control station is associated may be of the space radio type or of the carrier inductive type but that the specific form of control station here disclosed is for use with a two-channel carrier inductive system. That is, a two-way conversation between the operator of the wayside tower and a train can be had on a push-to-call basis on either of two carrier frequencies. This two-channel system may be, for example, similar to that covered in a copending application for Letters Patent of the United States, Serial No. 575,311, filed January 30, 1945, by Paul N. Bossart, for Railway Train Communication Systems, now Patent No. 2,484,680, granted October 11, 1949. This Bossart application and the present application are of common ownership and reference is made to the Bossart application for a full understanding of the construction and operation of a train communication system of the type here contemplated.

It is sufficient for the present application to point out that a two-way conversation can be had on either a high channel carrier of the order of, say 144 kilocycles, or on a low channel carrier of the order of, say 80 kilocycles, but other carrier frequencies can be used. The equipment includes two receivers, one for each channel and a single transmitter capable of being conditioned to supply carrier telephone current of either the high or low carrier channel. Also, calling means is provided for sending a distinctive tone frequency for each of the two channels. Each receiver is in an active condition ready to receive during noncommunication periods and the transmitter is deenergized during noncommunication periods and is energized only during sending periods.

The apparatus is arranged so that when the high or low channel is selected for communication and the equipment correspondingly conditioned, the transmitter and the receiver of the selected channel are alternately energized through a push-to-talk button from a power unit which is provided for the system. Generally, the primary power source is a low voltage direct current source of say 32 volts, and the power unit includes a motor generator or other device operable to convert the low voltage into a relatively high voltage suitable for use with the plate circuits of electron tubes included in the receiver and transmitter. In a preferred form the power unit also includes three contactors, a first one of which serves as a starting contactor for connecting the primary power source to the motor generator and to the other elements of the equipment. A second and a third contactor are put under the control of a push-to-talk button and a channel selector key of the control station. The arrangement is such that the second contactor is placed under the control of the push-to-talk button when the high channel is selected and serves to connect the high voltage terminals of the motor generator to the high carrier receiver tubes or to the transmitter tubes according as the second contactor is released or picked up, the contactor being picked up when the push-to-talk button is closed. The third contactor of the power unit is placed under the control of the push-to-talk button when the low channel is selected and it controls the connections of the high voltage terminals of the generator to the plate circuits of the tubes of the low channel receiver and the transmitter according as this contactor is released or picked up, the third contactor being picked up when the push-to-talk button is closed. Furthermore, the second and third contactors of the power unit are used to control the connection of the microphone circuit to the transmitter during sending periods. In accordance with the usual practice, the positive terminal of the primary power source and the negative terminal of the high voltage generator of the power unit are connected to ground.

In train communication systems of the type here involved, the line wires paralleling the track serve as elements of a transmitting channel due to the longitudinal circuit formed by the line wires and their distributed impedance to ground. At wayside towers, the telephone receivers and transmitters of the train communication system are coupled to this transmitting channel by being coupled to the line wires.

Referring again to Fig. 3, the high and low channel receivers are shown conventionally at HR and LR, respectively, the input of the receiver HR being coupled to a first pair of line wires L1 and L2 extending from the tower, the connection of the receiver to the line wires being completed through a transformer and a pair of capacitors as will be readily understood by an inspection of the drawing. The input of the low channel receiver LR is coupled to a second pair of line wires L3 and L4 in multiple through another transformer and a pair of capacitors. Also, the output of the transmitter which is here indicated conventionally at TR is coupled to a third pair of line wires L5 and L6 in multiple through a transformer and a pair of capacitors.

In Fig. 3, the power unit of the train telephone system is indicated conventionally at PU, power being supplied to the unit from a primary source, not shown, over a pair of wires 10 and 11. The positive low voltage terminal of the power unit is indicated at X32 and the negative terminal at N32. The positive high voltage terminal of the unit for the transmitter TR is indicated at BT1 and for the receivers HR and LR it is indicated at B250. The negative high voltage terminal of the power unit is connected to ground as pointed out hereinbefore.

The control station WCS is provided with a series of terminals for connecting outside circuit wires with corresponding elements of the station. In practicing the invention these terminals are grouped at a terminal board, not shown, located at the back of the cabinet. For the sake of simplicity, these terminals are indicated in Fig. 3 by small circles placed on the control station rectangle WCS.

Referring now to Figs. 1 and 2 as well as to Fig. 3, a toggle power-off switch PO is located on the front panel FP. This switch PO is connected through terminal PC to the first contactor of the power unit and through terminal 12 to the negative terminal of the primary power source, the arrangement being such that when the switch is open power is cut off from the equipment and when it is closed the previously mentioned first contactor of the power unit is energized and picked up to start the motor generator and to apply power to terminal N32 of the power unit.

A lamp 13 mounted on the panel FP above the switch PO is connected across terminals X32 and N32 and is illuminated when switch PO is closed and power is made available for the equipment of the associated train communication system.

The dispatcher's line telephone equipment for the tower is shown at the left-hand portion of Fig. 3, the apparatus being indicated conventionally at DT since it would be of standard arrangement and its specific structure forms no part of our invention. The apparatus or equipment DT is connected by wires 8 and 9 to a two-wire line circuit extending between a dispatcher's office and the tower. The equipment DT would include the previously mentioned concentrator unit and selector ringer and other apparatus.

The operator at the tower is provided with a head set HS and a microphone MIC of the usual construction and which head set and microphone are selectively coupled to the dispatcher's telephone equipment or to the train telephone equipment through a controller of the control station WCS. To this end the control station is provided with a telephone selector controller TS which is operatively connected as indicated by a dotted line to a key TK which is located on the front panel of the cabinet CD. The key TK is a two-position key operable to a neutral or center position and to an operated position, the key being of the type that it is locked in the position to which it is last moved until the operator changes its position. In the neutral position of the key TK, that is, the position shown in the drawing, the controller TS is moved to a first position and the head set HS and microphone MIC are connected to the dispatcher's line telephone equipment DT, the connection of the head set HS including terminals RI1 and RI2, closed contacts 15 and 16 of the controller TS and terminals RO1 and RO2; and the connection of the microphone MIC including terminals MI1 and MI2, contacts 17 and 18 of the controller TS and terminals MO1 and MO2. When the key TK is moved to its operated position the contacts 15, 16, 17, and 18 are opened to disconnect the head set HS and microphone MIC from the line telephone equipment DT and other contacts are closed to connect the head set and microphone to the train telephone equipment. To be specific, the head set HS is now connected across a given portion of a resistor 19 interposed in the output of the receivers in a manner to appear hereinafter, the connection including terminal RI2, contact 20 of controller TS, resistor 19 to a preselected intermediate terminal 76, contact 21 of controller TS and terminal RI1. The microphone is now provided with a circuit that is powered from the power unit PU and is connected to the input of transmitter TR for modulating the carrier produced thereby by the voice frequencies created by speaking into the microphone. This microphone circuit includes terminal M1 connected to the low voltage positive terminal X32 at the power unit, contact 22 of controller TS, terminal MI1, microphone MIC, terminal MI2, contact 23 of controller TS, terminal M2 and to the input side of the transmitter TR.

A contact 24 of the operator's usual foot switch is connected to terminals SI1 and SI2 of the control station and the foot switch is made effective as a push-to-talk device for the train telephone system through a contact 25 of controller TS as will appear when the operation of the control station is described.

The high and low channels of the train communication system are selected by a controller 14 of the control station and which controller is operably connected as indicated by a dotted line to a channel selector key CS which is mounted on the front panel of the cabinet. This key CS is a three-position type having a neutral position, a high channel position by raising the key and a low channel position by lowering the key. The key CS is of the type that is locked in the position to which it was last moved and must be manually returned to its neutral position by the operator after each conversation on the train telephone system. At the neutral position of the channel selector key CS the output of the high channel receiver HR is coupled to a corresponding loud-speaker HLS mounted on the front panel of the cabinet. This output circuit includes the output side of the receiver HR to terminal CR1 of the control station, contact 27 of controller 14, wire 28, winding 29 of a transformer T1, wire 30 and ground at terminal X32. The operating winding of the high channel loud-speaker HLS is connected across an adjustable portion of a voltage divider-resistor 34, which is connected across a second winding 35 of transformer T1. Similarly, the output of the low channel receiver LR is connected to a corresponding low channel loud-speaker LLS mounted on the front panel at the right-hand end of the cabinet. This output circuit extends from the output of receiver LR to terminal CR3 of the control station, contact 31 of controller 14, wire 32, winding 33 of a transformer T4, and wire 30 to ground at terminal X32. The operating winding of the low channel loud-speaker LLS is connected across a given portion of a voltage divider-resistor 36 which in turn is connected across winding 37 of transformer T4.

A high channel indicator lamp HL is connected across a winding 38 at transformer T1 and a low channel indicator lamp LL is connected across winding 39 of transformer T4. The lamp HL is placed on the front panel just to the right of the loud-speaker HLS and the low channel lamp LL is placed on the panel to the left of the loud-speaker LLS. The adjustable contact 40 of resistor 34 for adjusting the volume of the loud-speaker HLS is operatively connected to a knob 41 of the panel FP and the adjustable contact 42 of resistor 36 for adjusting the volume of the loud-speaker LLS is operatively connected to a knob 43 of the panel.

It follows from the foregoing description that under the neutral position of the key CS and its selector controller 14, a call received through a high channel receiver HR will be sounded at the loud-speaker HLS and visually indicated at lamp HL, the volume of the loud-speaker being determined by the setting of the contact 40 through knob 41; and a call received through the low channel receiver LR will be sounded at loud-speaker LLS and visibly indicated at lamp LL, the volume of the loud-speaker being determined by the setting of the contact 42 through knob 43.

The control station includes a noise control or suppression key for each channel, keys HNK and LNK being mounted on the front panel of the cabinet and associated with the high channel and the low channel respectively. These keys are of the three-position self locking type and have a neutral, an up and a down position. Looking at key HNK, a controller 45 (Fig. 3) is connected therewith by means not shown. The neutral position of this controller closes a contact 46 which completes a circuit connection from ground through a variable resistor to terminal NS1 and thence to the high channel receiver HR, the arrangement of the variable resistor being such that the receiver is conditioned to properly operate with the noise ordinarily existing in the tower. When the noise is excessive, the key HNK is raised to close contact 47 of controller 45 and an additional resistor is interposed in the connection to the receiver HR to quiet the receiver. This does not silence the receiver but decreases the gain to a point where most noise will be inaudible. Strong signals will still be received by this receiver and the indicating lamp HL will be effectively controlled by the output of the receiver. In the event the noise is extremely bad and it is necessary to silence the loud-speaker HLS to enable the operator to properly take a message over the dispatcher's telephone circuit, the operator can depress key HNK and close contact 48 of controller 45 and thereby short circuit the loud-speaker HLS. This condition of the loud-speaker, however, in no manner effects the display of the lamp HL. Similarly the low channel noise control key LNK actuates a controller 49, a neutral position contact 50 of which closes a circuit from ground through a variable resistor to terminal NS2 and thence to the low receiver LR to condition that receiver where it will effectively operate under the usual noise condition. The raised position of key LNK closes contact 51 of controller 49 and interposes additional resistance in the connection to the receiver to quiet the receiver when noise conditions are excessive. Also, the down position of the key closes contact 52 of the controller 49 to short circuit the loud-speaker LLS. It is to be observed that the lamp LL is properly illuminated under the low condition of the receiver LR and also when the loud-speaker LLS is short circuited.

A call selector key CSK is mounted on the front panel FP and operatively connected as indicated by a dotted line to a controller 53 for governing the calling tones of the channels. The key CSK is a three-position key which is spring biased to automatically restore to its neutral position from either its up or down position. At the neutral position of key CSK all the contacts of controller 53 are open. At the up position of the key contacts 54 and 55 of the controller are closed connecting terminal N32 of the control station to terminals CS1 and TR1, respectively. The terminal TR1 is connected to the previously mentioned second contactor of the power unit and the contactor is energized which, as it will be recalled, removes plate voltage from the tubes of the receiver HR and applies plate voltage to the transmitter TR causing the transmitter to be active. Power applied to terminal CS1 of the control station conditions the transmitter TR to supply the high channel calling tone.

At the down position of key CSK, contacts 56, 57, and 58 are closed connecting the terminal N32 to terminals TR2, CS2, and FR2, respectively. Terminal TR2 is connected to the previously mentioned third contactor of the power unit, and which contactor it will be recalled, when energized removes plate voltage from the tubes of the receiver LR and applies plate voltage to the tubes of a transmitter TR so that the transmitter is active. With terminals CS2 and FR2 connected to terminal N32, the transmitter TR is conditioned for the transmitter to supply the low channel calling tone. Thus for sending a high channel calling tone the key CSK is raised to its up position and held in that position as long as the calling tone is to be sent out, and the key CSK when depressed causes the low channel calling tone to be sent out.

A hand set HST is provided for the control station and normally positioned in a cradle at the top of the station as will be evidenced from an inspection of Figs. 1 and 2. This hand set is for use with the train communication system by the operator in case of emergency or by a maintainer or supervisor without disturbing the operator. The hand set HST is governed by a hand set key HSK mounted on the front panel of the cabinet and operatively connected as indicated by a dotted line to a controller 60 (Fig. 3). The key HSK is of the two position type having a neutral or "off" position and a down or "on" position. At the "off" position of the key HSK the controller 60 is open and at the "on" position of the key the controller contacts are closed to connect the earphone, microphone and push button of the hand set to the train communication equipment. The closing of contacts 61 and 62 of controller 60 prepares a connection by which terminal N32 can be connected to either terminal TR1 or TR2 by closing of the push button 59 of the hand set, the two terminals of the push button 59 being connected to terminals NB and PB of the control station. The connection to the terminal TR1 is completed through the channel selector controller 14 when it is set at its raised position closing contact 63 and the connection to terminal TR2 is completed when the channel selector controller 14 is set at its down position closing contact 64. It will be recalled that terminal TR1 is connected to the second contactor of the power unit PU and terminal TR2 is connected to the third contactor of the power unit, and the second contactor controls the connection of the high plate voltage terminal of the power unit to the high channel receiver HR or transmitter TR and the third contactor controls the connection to the low channel receiver LR or transmitter TR.

Contacts 67 and 68 of the controller 60 when closed complete a circuit for microphone 65 of the hand set HST and which circuit extends from terminal M1 of the control station to contact 26 of the system selector controller TS, wire 66, contact 67 of controller 60, terminal HM1, microphone 65, terminal HM2, contact 68 of controller 60, wire 69, terminal M2 and to the input of the transmitter TR. Thus voice frequencies created in the microphone 65 of the hand set are applied to the transmitter for modulating the carrier.

Referring again to the channel selector key CS this key when set at the high channel position closing contact 71 of controller 14 completes the connection for the output of the high receiver HR across resistor 19, this output circuit including the output of receiver HR to terminal CR1, contact 71, resistor 19 and ground at terminal X32. Thus with the controller 14 set for the high channel and controller 60 closed, the voltage drop across a portion of the resistor 19 is applied to the earphone 70 of the hand set from terminal 76 through wire 72, contact 73 of controller 60, terminal HR1, earphone 70, terminal HR2, contact 74 of controller 60, and to the top terminal of resistor 19. Again when the channel selector controller 14 is set for the low channel, closing contact 75, resistor 19 is included in the output of the low receiver LR, the connection including the output of receiver LR to terminal CR3, contact 75, resistor 19 and ground. With controller 60 closed, the earphone 70 is connected across a portion of the resistor 19 as previously traced and the voltage drop appearing at terminal 76 is applied to the earphone 70 of the hand set. The intermediate terminal 76 of resistor 19 is operatively connected to a knob TEL mounted on the front panel of the cabinet of the control station, and the operator can easily adjust the response in the earphones. It should be here noted that this adjustment of terminal 76 also serves to govern the response in the head set HS since, as previously pointed out, the head set HS is at times connected across this same portion of the resistor 19. It follows that with the hand set key HSK moved to its "on" position, the hand set HST can be used with either the high channel or the low channel of the train telephone equipment.

The control station is also provided with two transformers T2 and T3 and two jacks HJ and LJ for coupling the dispatcher's telephone line circuit to the train communication equipment to enable the dispatcher to listen in on the conversation between a train and the operator at the tower. The jacks HJ and LJ are mounted on the front panel and can be connected to the dispatcher's telephone equipment DT by a cord circuit plugged into the jacks HJ or LJ and a jack 77 associated with the equipment DT. The jacks HJ and LJ are associated with the high and low channel, respectively, of the train telephone equipment through transformers T2 and T3, respectively. Primary windings 78 and 79 of transformers T2 and T3 are connected to the output of the receivers HR and LR at terminals CR1 and CR3, the connection of winding 78 to terminal CR1 including wire 89 and the connection of winding 79 to terminal CR3 including wire 80. Thus a portion of the output of the receiver HR is applied to transformer T2 to induce corresponding electromotive forces in the secondary winding 81 and which winding is in turn connected to the jack HJ. Also a portion of the output of receiver LR is applied to primary winding 79 of transformer T3 through wire 80 and a corresponding electromotive force is induced in secondary winding 82 and which winding is connected to jack LJ.

In order to provide sufficient voice frequency energy during the operator's side of a train-to-operator conversation for the dispatcher's line circuit, primary windings 83 and 84 of transformers T2 and T3, respectively, are coupled to the microphone circuit through an amplifier AM, the amplifier AM being shown in block form in the control station since this amplifier would be one or more stages of standard form. The plate or output circuit of the amplifier is powered from terminal BT1 of the control station through a voltage dropping resistor 91 and which terminal is connected to the power unit terminal for supplying energy to the transmitter TR as previously explained. Thus plate voltage is supplied to amplifier AM only when the transmitter is energized. When the channel selector controller 14 is set in its raised position to select the high channel the terminal BT1 is connected to the amplifier AM through winding 83 of transformer T2, contact 85 of controller 14, wire 86 and plate circuit of the amplifier AM to ground. When the channel selector 14 is set at its down position to select the low channel, the output of the amplifier AM is connected to the terminal BT1 through winding 84 of transformer T3 and contact 87 of the controller 14. The input side of the amplifier AM is coupled to the microphone circuit at wire 69 through a capacitor 88. It follows that when either the microphone MIC or the microphone 65 of the hand set is used in connection with the train communication equipment, a portion of the voice frequency energy is applied to the amplifier AM and the amplified energy becomes available at jack HJ or LJ for transmission to the dispatcher through the dispatcher's telephone equipment.

In describing the operation of the apparatus, the normal or non-communicating condition of the control station will first be considered, it being understood that the power-off switch PO is closed to power the train communication equipment, the lamp 13 being illuminated to indicate that power is available. In this normal condition, the loud-speakers HLS and LLS and the respective indicator lamps HL and LL are connected to the respective receivers to receive a call through the train communication equipment due to the fact that the channel selector key is set at its neutral position. Furthermore, the head set HS and the microphone MIC are connected to the dispatcher's line telephone equipment DT through the neutral position of the telephone selector controller TS and the operator at the tower is in a position to communicate with the dispatcher through the usual dispatcher's telephone equipment.

Assume next that a call comes in on the high channel. The operator can answer this call by simply raising the telephone key TK and setting the channel selector key CS at the high channel position. This switches the head set HS and the microphone MIC to the train communication equipment and also connects the foot switch contact 24 to the train communication equipment as a push-to-talk device. In answering the call the operator would close the foot switch to connect terminal N32 of the control station to terminal TR1 through contact 25 of the controller TS and contact 63 of controller 14, the terminal TR1 of the control station being connected as previously explained to the second contactor of the power unit and which contactor when picked up switches plate voltage from the receiver HR to the transmitter TR to energize the transmitter. Under this condition the operator answers the call by speaking the proper salutation into the microphone MIC which microphone is now connected to the input of the transmitter. Since the head set HS is connected across a portion of the resistor 19 interposed in the output of the receiver HR a two-way conversation between the operator and the train crew on the high channel can be effected by proper operation of the foot switch as a push-to-talk device.

In the event a call comes in on the low channel the operator can answer in a similar manner, except the channel selector key CS is pressed down to select the low channel. It is to be observed that while the high channel is being used, the low channel loud-speaker LLS and indicator lamp LL remain connected to the output of the low receiver LR to receive a call on the low channel and also while the equipment is being used on the low channel, the high channel loud-speaker HLS and lamp HL remain connected to the high receiver HR to receive a call on that channel, this arrangement being effected due to the construction of the controller 14 in two portions.

We shall next assume that a maintainer or some other person desires to use the train telephone system without disturbing the operator. To use the hand set HST the hand set key HSK is set at its "on" position to close controller 60 to connect the hand set to the train telephone equipment, the connection being completed by setting the channel selector key CS at the high channel position, if the high channel is to be used, and at its low channel position, if the low channel is to be used. In using the hand set it is to be recalled that the circuit for the microphone 65 of the hand set is completed through contact 26 of the system selector controller TS. Thus if some condition arises which would require the operator to take over the use of the train communication equipment he can lock out microphone 65 of the hand set and switch his own head set HS and microphone MIC to the train telephone equipment by simply raising the key TSK to operate the controller TS. That is to say, the contact 26 of controller TS serves as an interlock by which the operator is given priority over the maintainer in the use of the train telephone system.

In the event the operator is carrying on a conversation with a train crew and the dispatcher at the remote office wishes to listen in on the conversation this can be effected through the control station. To do this, the operator plugs in a cord circuit between jacks HJ and 77 if the high channel is being used and between jacks LJ and 77 if the low channel is being used. In either case the output of the receiver HR or LR as the case may be, is applied to the dispatcher's line circuit through the transformer T2 or T3 and the cord circuit between the jacks of the control station and of the dispatcher's telephone equipment so that the train crew's conversation is transmitted to the remote office. As to the operator's conversation, a portion of the energy of the microphone circuit whether the microphone MIC of the microphone 65 of the hand set is being used is applied to the amplifier AM and through the transformer T2 or T3 and the cord circuit to the dispatcher's telephone equipment and the operator's conversation is supplied to the remote office.

Control apparatus of the construction here disclosed has the advantages that the equipment of the two telephone systems are correlated in a manner that the operator can conveniently and quickly answer calls on either system from a single position and also that the operating characteristics of the one system, that is, the train telephone system are improved by the apparatus of the control station.

Although we have herein shown and described but one form of control apparatus for telephone systems embodying our invention, it is understood that various changes and modifications may be made therein within the scope of the appended claims without departing from the spirit and scope of our invention.

Having thus described our invention, what we claim is:

1. In combination, line telephone equipment including means for using a voice frequency telephone current and having connections to a line circuit, carrier inductive telephone equipment including a carrier receiver and a carrier transmitter and coupled to a transmitting channel, said carrier receiver including a demodulator which is effective to demodulate a given carrier telephone current, said carrier transmitter including an oscillator and a modulator which are effective for supplying said given carrier telephone current, a head set having a telephone receiver, a microphone, a transformer having a first and a second primary winding and a secondary winding, a circuit controller having contacts which may be closed at either a first and a second position, circuit means including contacts of said controller closed at said first position to connect said head set and microphone to said line telephone equipment, other circuit means including contacts of said controller closed at said second position to connect said head set to said carrier receiver and said first primary winding in multiple and to connect said microphone to said carrier transmitter and said second primary winding in multiple, a first jack connected to said secondary winding, and a second jack connected to said line telephone equipment, said first and second jacks enabling a cord circuit connection to be made between the line telephone equipment and said transformer whereby said head set and microphone can be used with said carrier inductive telephone equipment alone or used with said carrier telephone equipment and the conversation repeated to said line circuit through said transformer and said jacks with their cord circuit connection.

2. In a control station for a two channel carrier telephone system, the combination comprising, a first and a second loud-speaker each of which is provided with an energizing winding, a first and a second visual indicator each of which is provided with a lamp and an energizing winding connected to the lamp, a first and a second pair of receiver terminals, a pair of earphone terminals; a selector switch having a first, a second and a third position and provided with contacts different ones of which contacts are closed at the different positions; a first circuit means including contacts of the selector switch closed at its first position to connect said first loud-speaker winding and said first indicator winding across said first pair of receiver terminals and to connect said second loud-speaker winding and said second indicator winding across said second pair of receiver terminals, a second circuit means including contacts of said selector switch closed at its second position to connect said earphone terminals to said first pair of receiver terminals and to connect said second loud-speaker winding and said second indicator winding across said second pair of receiver terminals, and a third circuit means including contacts of said selector switch closed at its third position to connect said pair of earphone terminals to said second pair of receiver terminals and to connect said first loud-speaker winding and said first indicator winding across said first pair of receiver terminals.

3. In a control station for a two channel carrier telephone system, the combination comprising, a first and a second loud-speaker each of which is provided with an operating winding, a first and a second visual indicator each of which is provided with a lamp and an energizing winding connected to the lamp, a first and a second pair of receiver terminals, a pair of earphone terminals; a multiple position circuit controller provided with contacts different ones of which contacts are closed at different positions of the controller, a first circuit means including contacts of said controller closed at a first position to couple said first loud-speaker winding and said first indicator winding across said first pair of receiver terminals and to couple said second loud-speaker winding and said second indicator winding across said second pair of receiver terminals, a second circuit means including contacts of said controller closed at a second position of the controller to connect said pair of earphone terminals across said first pair of receiver terminals and to couple said second loud-speaker winding and said second indicator winding across said second pair of receiver terminals, a third circuit means including contacts of said controller closed at a third position of the controller to connect said pair of earphone terminals across said second pair of receiver terminals and to couple said first loud-speaker winding and said first indicator winding across said first pair of receiver terminals, a first and a second control switch each of which is provided with a contact closed at a given position of the respective switch, means including said contact of said first control switch to short circuit said first loud-speaker winding, and means including said contact of said second control switch to short circuit said second loud-speaker winding.

4. In a control station for a carrier telephone system, the combination comprising, a main telephone set including a telephone receiver and a microphone, a hand set having an earphone and a microphone, a first and a second multiple position circuit controller, each said controller being provided with contacts closed at the different positions of the controller, each said controller being provided with a first and a second position, a pair of receiver terminals, a pair of transmitter terminals, a first circuit means including contacts of said first controller closed at the second position of the first controller to connect the telephone receiver and microphone of said telephone set across said pair of receiver terminals and pair of transmitter terminals respectively, a second circuit means including contacts of said second controller closed at the second position of that controller to connect the earphone and microphone of said hand set across said pair of receiver terminals and said pair of transmitter terminals respectively, and said second circuit means including a contact of said first controller closed at the first position of the first controller to render said hand set ineffective when the first controller is set at its second position.

EDGAR W. BREISCH.
GEORGE W. McKENNA.

REFERENCES CITED

The following references are of record in the file of this patent:

UNITED STATES PATENTS

| Number | Name | Date |
|---|---|---|
| 1,499,438 | Affel | July 1, 1924 |
| 1,552,919 | Gauthier | Sept. 8, 1925 |
| 2,064,639 | Whitelock | Dec. 15, 1936 |
| 2,142,874 | Sadowsky | Jan. 3, 1939 |
| 2,269,143 | Campbell | Jan. 6, 1942 |
| 2,309,747 | Bossart | Feb. 2, 1943 |